United States Patent
Pugh

(10) Patent No.: US 10,832,637 B1
(45) Date of Patent: Nov. 10, 2020

(54) SYSTEMS AND METHODS OF ENHANCING THE BRIGHTNESS OF DIGITAL DISPLAYS

(71) Applicant: KYOCERA Document Solutions Inc., Osaka (JP)

(72) Inventor: Eric Pugh, Torrance, CA (US)

(73) Assignee: KYOCERA Document Solutions Inc. (JP)

(*) Notice: Subject to any disclaimer, the term of this patent is extended or adjusted under 35 U.S.C. 154(b) by 0 days.

(21) Appl. No.: 16/368,499

(22) Filed: Mar. 28, 2019

(51) Int. Cl.
| | |
|---|---|
| G09G 5/10 | (2006.01) |
| G06F 3/12 | (2006.01) |
| G09G 3/34 | (2006.01) |
| H04N 1/00 | (2006.01) |

(52) U.S. Cl.
CPC ............ *G09G 5/10* (2013.01); *G06F 3/1203* (2013.01); *G06F 3/1237* (2013.01); *G06F 3/1279* (2013.01); *G09G 3/3453* (2013.01); *H04N 1/00384* (2013.01); *G09G 2300/023* (2013.01); *G09G 2310/08* (2013.01); *G09G 2354/00* (2013.01); *G09G 2360/144* (2013.01); *G09G 2380/02* (2013.01)

(58) Field of Classification Search
None
See application file for complete search history.

(56) References Cited

U.S. PATENT DOCUMENTS

| | | | | |
|---|---|---|---|---|
| 2008/0080010 | A1* | 4/2008 | Korst | H04N 1/00347 358/401 |
| 2011/0194036 | A1* | 8/2011 | Okajima | G02F 1/13318 349/1 |
| 2016/0111037 | A1* | 4/2016 | Kim | G02F 1/13306 345/690 |

FOREIGN PATENT DOCUMENTS

CN 102956184 A * 3/2013

* cited by examiner

*Primary Examiner* — Thomas D Lee
(74) *Attorney, Agent, or Firm* — L/O Alexis J Saenz

(57) ABSTRACT

A system, method, and apparatus provide brightness enhancement for digital displays. The digital display of an electronic apparatus may be augmented with an E-Ink based display module. Embodiments may replicate the content of the digital display shown on the E-Ink module display. The content is shown in a high contrast output that is readable even though the ambient light intensity may overwhelm the readability of the original digital display. Some embodiments include a clock which may trigger automatic operation of the E-Ink module. Some embodiments may include a transparent E-Ink module which may show replicated content obscuring the view an underlying digital display or which may remain transparent when the digital display is readable under the current light.

15 Claims, 5 Drawing Sheets

SYSTEMS AND METHODS OF ENHANCING THE BRIGHTNESS OF DIGITAL DISPLAYS

CROSS-REFERENCE TO RELATED APPLICATION

None.

FIELD

The subject disclosure relates to digital displays and more particularly to systems and methods of enhancing the brightness of digital displays.

BACKGROUND

Many electronic products now commonly include a digital display. Digital displays generally have a brightness control. For example, several liquid crystal display (LCD) panels have a Light Emitting Diode (LED) backlight. Brightness control will generally drive the LED backlight in a range of adjustment so that the display content may be more visible. In brighter environments, the backlight may be adjusted to produce higher intensity light. In darker environments, the backlight may be adjusted to a lower intensity.

SUMMARY

In one aspect of the disclosure, a system for enhancing the brightness of a digital display on a printing apparatus is disclosed. The system comprises an electronic-ink (E-ink) module; a brightness detection module; a display reader module configured to read content shown in the digital display; a brightness enhancer controller connected to the E-ink module, the brightness detection module, and to the display reader module, wherein the brightness enhancer controller is configured to: determine an ambient brightness level from a signal generated by the brightness detection module, read, from the display reader module, the content shown in the digital display, and display on the E-ink module, the read content shown on the digital display in response to the ambient brightness level rising above a threshold value.

In another aspect, a printing apparatus is disclosed. The printing apparatus comprises a digital display for displaying information; an electronic-ink (E-ink) module; a brightness enhancer controller connected to the E-ink module, wherein the brightness enhancer controller is configured to: read content shown in the digital display, and display on the E-ink module, the read content shown on the digital display.

In yet another aspect, a method of enhancing the brightness of a digital display is disclosed. The method comprises: determining, by a processing unit, an ambient brightness level incident on the digital display; reading, by the processing unit, content shown in the digital display; and displaying on an electronic-ink (E-ink) module positioned on top of or proximate the digital display, the read content shown on the digital display in response to the ambient brightness level rising above a threshold value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of electronic displays.

While brightness control may increase the brightness output of a digital display, sometimes the ambient brightness washes out the range of brightness output by the display. Electronic product displays do not always have a high contrast ratio for viewing in bright environments.

For example, most printers provide an LCD interface panel. In an example scenario, a printer may be set near a window so that as the sun moves, sunlight may enter through the window onto the printer. In another scenario, a printer may be positioned near an intense light source causing a strong glare to be cast onto the LCD panel.

As such, it is known for LCD panels and other digital displays to suffer from loss in readability due to bright sunlight or strong light glare interfering with the display content. For example, smart phones, laptop computers, tablet computers, televisions and other display products also have display content whose viewability suffers from bright sunlight or glare.

Embodiments described below provide a solution to the loss of readability in digital displays due to bright light interference.

Generally, embodiments of the disclosure below provide a system for enhancing the brightness of a digital display. As will be appreciated, aspects of the subject technology provide a high contrast ratio that may be manually or automatically adjusted based on the brightness incident on a digital display. In some embodiments, an existing digital display may be retrofit with after-market embodiments disclosed below so that high contrast ratio displays are made available on existing products.

Figure 1:
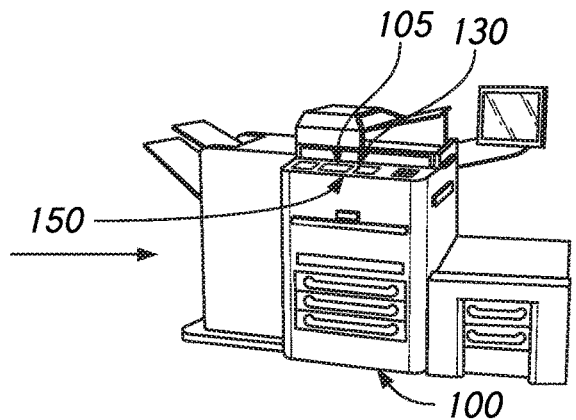
FIG. 1 is a front perspective view of a printing apparatus with a system for enhancing the brightness of a digital display in accordance with an embodiment of the subject technology.
Figure 2:
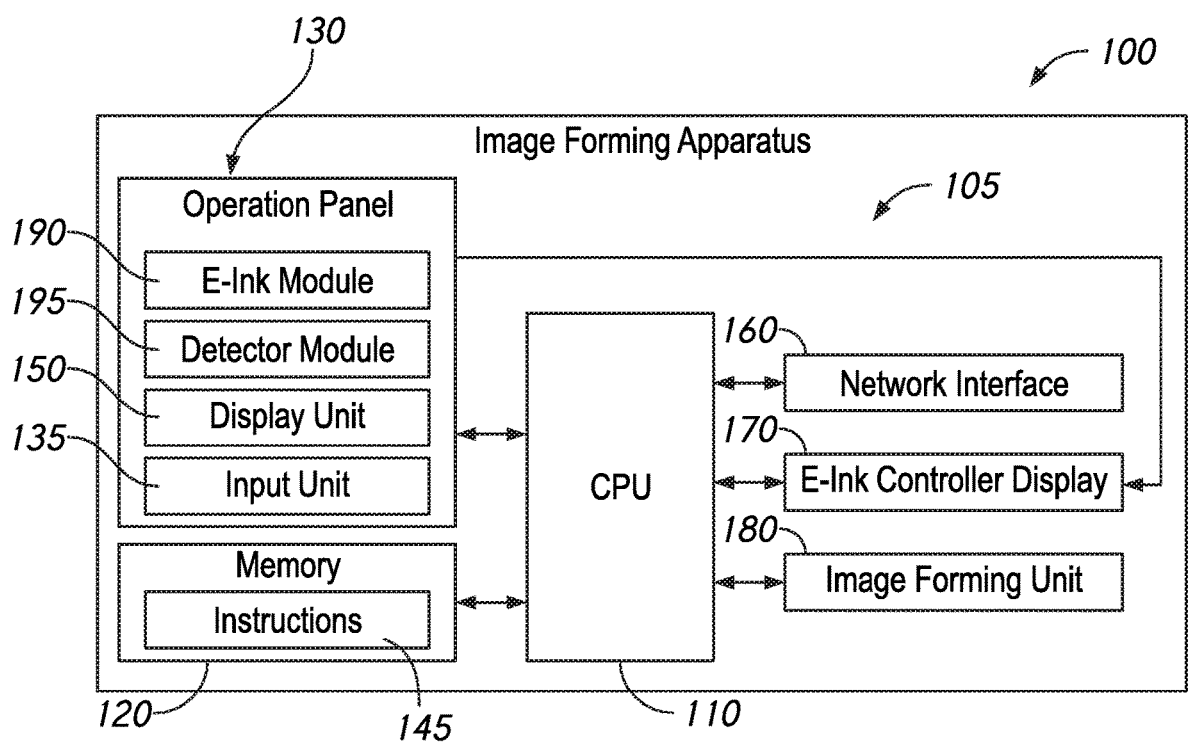
FIG. 2 is a block diagram of the printing apparatus with the system of FIG. 1 in accordance with an embodiment of the subject technology.
Figure 3:
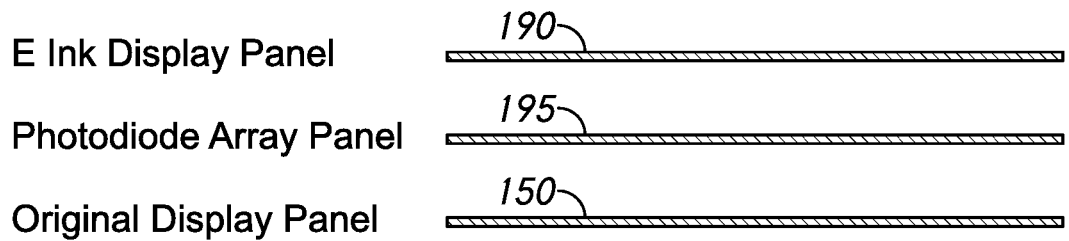
FIG. 3 is a diagrammatic view of layers in the system of FIG. 1 in accordance with an embodiment of the subject technology.
Figure 3A:
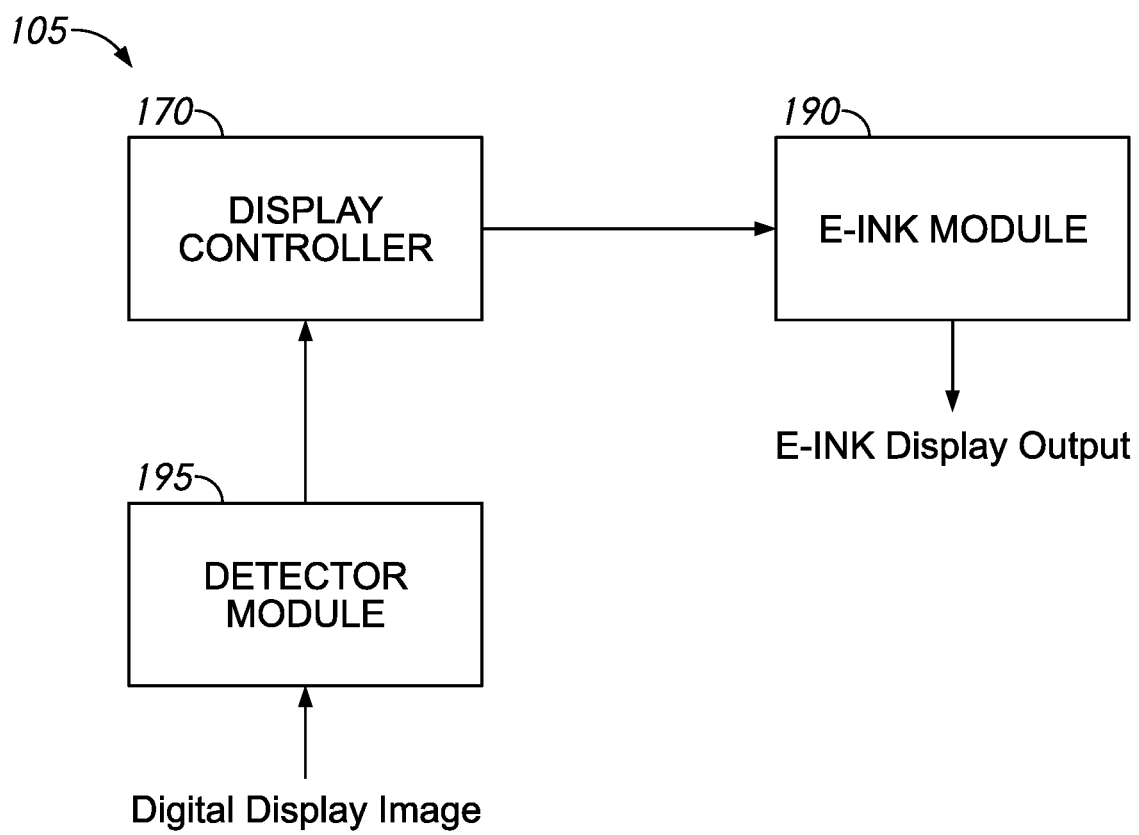
FIG. 3A is a block diagram of a system for enhancing the brightness of a digital display in accordance with an embodiment of the subject technology.
Figure 4:
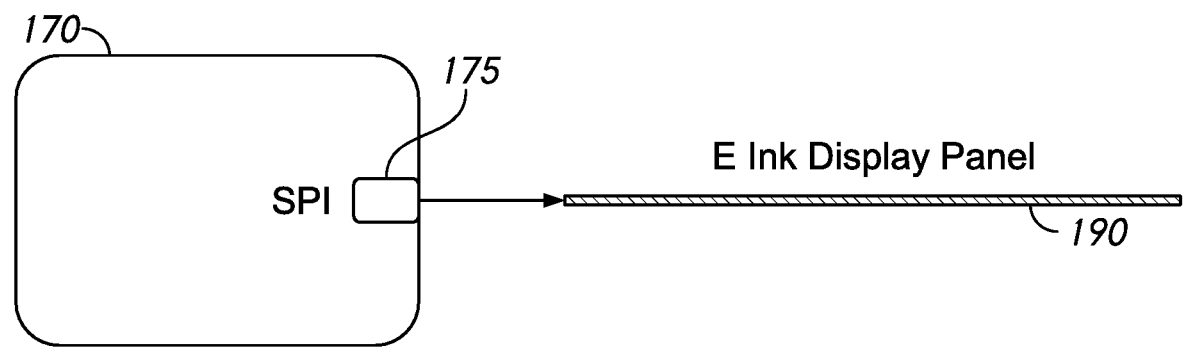
FIG. 4 is a diagrammatic view of a connection between an electronic ink layer and a controller in the system of FIG. 1 in accordance with embodiments of the subject technology.

Referring now to FIGS. 1 and 2, an apparatus 100 is shown according to an exemplary embodiment. For sake of illustration, the apparatus 100 is shown as a printing apparatus in FIG. 1. However, as will be understood, other apparatuses with digital displays may incorporate aspects of the embodiments disclosed herein. The apparatus 100 may sometimes be referred to as an "image forming apparatus" 100 which may represent for example, printers, scanners, facsimile machines, and multi-function printers. The apparatus 100 may include a digital display 150, which may be integrated into an operation panel 130. In an exemplary embodiment, the digital display 150 may be augmented with a brightness enhancement system 105 (which may be referred to generally as the "system 105").

The system 105 (or parts thereof) may in some embodiments, be positioned directly atop the digital display 150. In some embodiments, the system 105 may be positioned proximate the digital display 150 in another section of the operation panel 130 as an adjunct display. In some embodiments, the system 105 may include its own power supply, for example, a battery. As may be appreciated, this avoids any dependence on the apparatus 100 for power. In addition, the system 105 does not create an extra load for the apparatus 100. In an exemplary embodiment, the system 105 may communicate with a processor or controller 110 of the apparatus 100. The processor or controller 110 may be a central processing unit coordinating the main functions of the apparatus 100. In some embodiments, an E-ink display controller 170 (referred to sometimes as a "brightness enhancer controller" or generally as the "controller 170"), may be included, which may be dedicated to controlling the enhancement of brightness control in the E-ink module 190. While FIG. 2 shows more elements, the discussion of these elements will be described below while discussion continues to focus on the system 105, the details of which are shown in FIGS. 3 and 3A-5.

Referring now to FIGS. 3 and 3A-6, a system 105 for enhancing brightness in a digital display is shown according to an exemplary embodiment. The system 105 may generally include a controller 170, an E-ink module 190, and a brightness detection module 195. The E-ink module 190 and the brightness detection module 195 may be resident on the operational panel 130. The controller module 170 may be remote from the E-ink module 190 and the brightness detection module 195, for example, inside the apparatus 100 proximate other electronics. The controller module 170 may be in communication the apparatus' controller 110. As will be appreciated, the E-ink module 190 and the brightness detection module 195 may be thin and flexible so that they may be arranged in layers over the digital display 150.

The brightness detection module 195 may be an optical detector. The brightness detection module 195 may be positioned to capture the image or content shown in the digital display 150. In an exemplary arrangement, the brightness detection module 195 may be positioned over the digital display 150. For example, a layer of photodiodes assembled in an array may be disposed to sense illuminated pixels as content in the digital display 150. As will be understood, content in the digital display may show for example, symbols, print settings or instructions based on user input into the operation panel 130 (FIG. 2). The content may be text or graphics that one would normally see when interacting with a product control panel. In some embodiments, the brightness detection module 195 may include one or more photodiodes dedicated to monitoring the ambient light on or proximate the digital display 150.

In an exemplary embodiment, the E-ink module 190 may be positioned over the digital display 150 to augment the display content by providing a high contrast ratio of content shown in the E-ink module. The E-ink module 190 may comprise a flexible thin film membrane housing including E-ink technology (for example, an electronic paper display (EPD) and/or microcapsules). The light within the E-ink module 190 may be distributed and appear front-lit from the perspective of a user looking overhead. In some embodiments, the E-ink module 190 may be directly on top of the detector module 195, which may in turn be positioned between the E-ink module 190 and the digital display 150. In some embodiments, the E-Ink module 190 may be transparent until content from the digital display 150 is displayed within the E-ink module 190.

Figure 5:
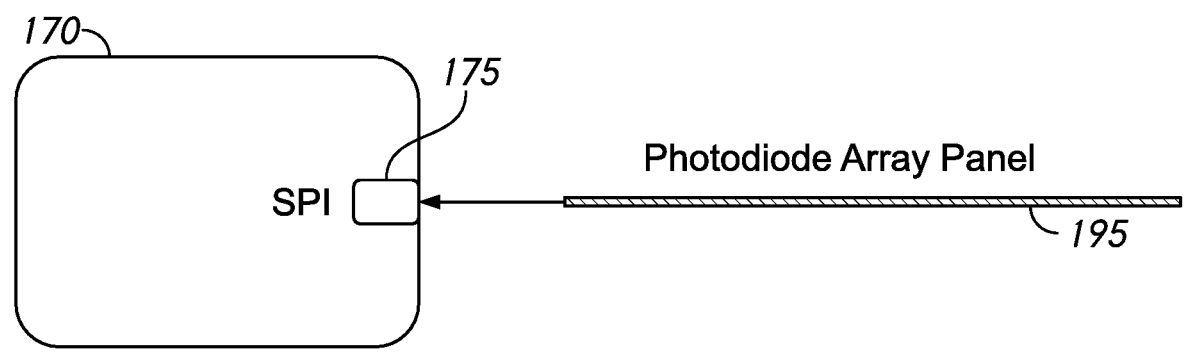
FIG. 5 is a diagrammatic view of a connection between a detector layer and a controller in the system of FIG. 1 in accordance with embodiments of the subject technology.

The controller 170 may include a serial peripheral interface (SPI) port 175 for communication with the E-ink module 190 and the brightness detection module 195. In operation, the detector module 195 may transmit the detected image content from the digital display 150 to the controller 170 (FIG. 5). The controller 170 may include a display reader module 165 which may read content shown in the digital display. The display reader module 165 may be a hardware device (for example, a processor or circuit) integrated into the controller 170 or may be software instructions controlled by a processor in the controller 170. The controller 170 may process the received data from the detector module 195 to create a replica of the content currently shown in the digital display 150. The processed data may be forwarded from the controller 170 to the E-ink module 190. The E-ink module 190 may replicate the content in the digital display 150 at a higher contrast ratio than the digital display 150. In some embodiments, the controller 170 may trigger the operation of the E-ink module 190 based on the detector module 195 detecting the ambient level exceeding a threshold value. In addition, since the content in the E-Ink module 190 may be front-lit, as will be appreciated, the content will be easier to see under the E-ink technology.

In addition, embodiments that include a flexible body in the E-ink module 190 may be advantageous when used with tactile response digital displays 150. The controller 170 may map the position of content in the digital display 150 so that the content is replicated in a one-to-one position within the E-Ink module 190 directly over the position of the original content in the digital display 150. For example, a digital "print" button in the digital display 150 may be directly beneath a replicated "print" button shown in the overhead E-ink module 190 display. The E-Ink module 190 flexible body may allow a user to press on the E-ink module 190 version of the "print" button, which touch may flex the E-ink module 190 body down into tactile range of the digital display 150. It will be understood that "tactile" does not necessarily mean in direct contact since some tactile displays operate on indirect sensory such as capacitance.

Figure 6:
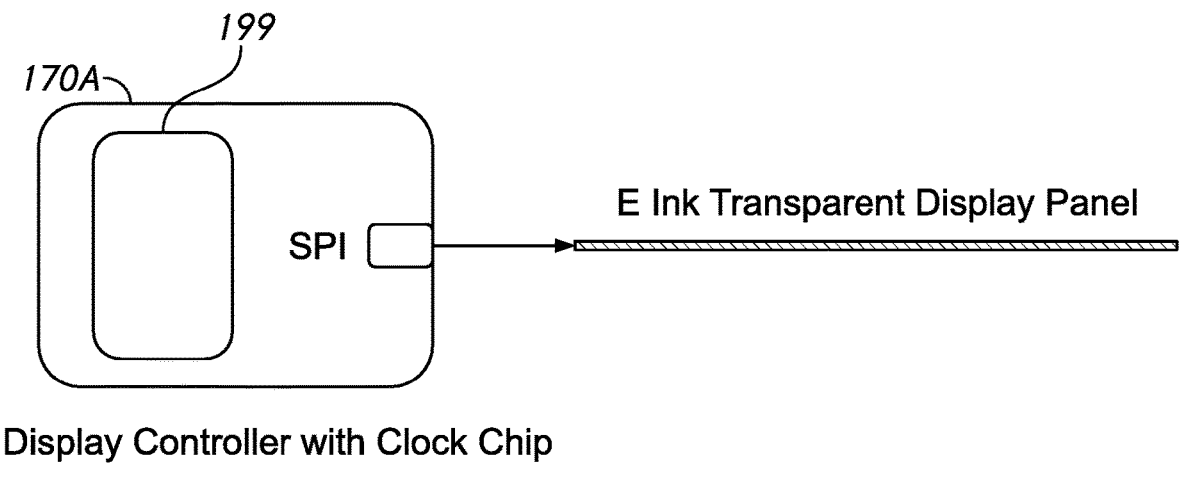
FIG. 6 is a diagrammatic view of a connection between a transparent electronic ink layer and a controller in the system of FIG. 1 with adjustable transparency in accordance with another embodiment of the subject technology.

Referring now to FIG. 6, in some embodiments, the system 105 may be configured for automatic brightness enhancement based on the time of day. Embodiments of the E-ink module 190 including a transparent body may not show any content when there is no need for brightness enhancement. Accordingly, in some embodiments, the digital display 150 will show through the E-ink module 190 by default and without obstruction. The controller 170 may include a clock 199 and programing that triggers operation of the E-ink module 190 based on a programmed range of time signaled by the clock (for example, based on the time of day). For example, during hours when the ambient light is expected to be low, the E-ink module 190 display may be turned off so that the E-ink module 190 may remain transparent. The underlying digital display 150 may thus be visible as it normally would were the system 105 not present. When the clock 199 registers a time of day where the ambient light is expected to be bright, the controller 170 may trigger operation of the E-ink module 190. The content in the E-ink module 190 may replicate that content present in the digital display 150 while blocking the view of the digital display 150. A bright ambient light condition may be for example, when sunshine is expected to impact the digital display 150 or when nearby lights are expected to turn on and overwhelm the contrast on the digital display 150.

Figure 7:
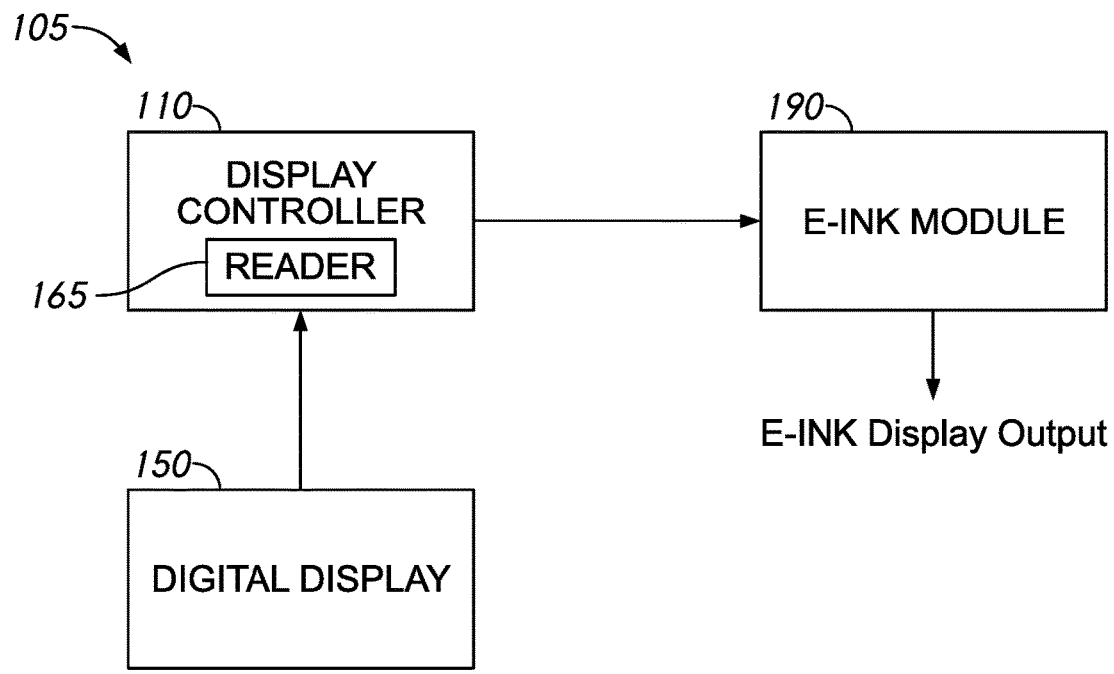
FIG. 7 is a block diagram of a system for enhancing the brightness of a digital display in accordance with an alternate embodiment of the subject technology.

Referring now to FIG. 7, the system 105 is shown according to an alternate embodiment. Some embodiments of the system 105 may connect directly to the apparatus' controller 110. In operation, the apparatus' controller 110 may be programmed to directly forward the digital display 150 content (since the controller 110 may already control what is shown in digital display 150) to the E-Ink module 190. The E-Ink module 190 may accordingly show the same content in its own display as the digital display 150 content by activation of the E-Ink technology by the controller 110. As may be appreciated, this embodiment allows for the omission of the controller 170 and the brightness detection module 195. In addition, the E-Ink module 190 may also be positioned anywhere on the operational panel 130. In some embodiments, the E-Ink module 190 may also include a tactile sensory layer capable of registering a user's touch selection of an element in the E-Ink module 190 display, which may trigger the same function or option shown in the digital display 150.

Referring back now to FIG. 2, the apparatus 100 is discussed in further detail. The apparatus 100 may be for example, a computing-based device. The components of the apparatus 100 may include, but are not limited to, one or more controllers (which may include one or more processors or processing units) 110, a system memory 120, an operation panel 130, an input unit 135, a set of program modules 145 including files and executable instructions, the digital display unit 150, and a network interface 160. In embodiments that are an image forming apparatus, the apparatus 100 may also include an image forming unit 180, which may convert image data into an image. The resultant image may be a digital image or may be a physical print out of an image. The apparatus 100 may also include a bus system that couples various system components including the system memory 120 to the controller 110 processor(s).

Aspects of the apparatus 100 may be described in the general context of computer system executable instructions, such as the program modules/instructions 145 which represent a software embodiment of the system and processes described generally above. The system memory 120 may store for example, the executable instructions. The program modules 145 generally carry out the functions and/or methodologies of embodiments as described above. The apparatus 100 may typically include a variety of computer system readable media. Such media could be chosen from any available media that is accessible by the apparatus 100, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 120 could include one or more computer system readable media in the form of volatile memory, such as a random-access memory (RAM) and/or a cache memory. The system memory 120 may include at least one program product 140 having a set of program modules 145 that are configured to carry out the functions of embodiments disclosed in the form of computer executable instructions. The program product/utility 140, having a set of program modules 145, may be stored in the system memory 120 by way of example, and not limitation, as an operating system, one or more application programs, other program modules, and program data. Some embodiments may generate an electronic user interface (viewable and controllable from the digital display unit 150 or the E-ink module 190 display). The electronic user interface may allow the user to interact with functions of the apparatus 100. One example interaction may include triggering processes that guide the user to a location in the image forming apparatus (or other device) for various purposes including device operation and troubleshooting.

The apparatus 100 may communicate with one or more external devices. Other devices may enable the apparatus 100 to communicate with one or more other computing devices, either by hardwire or wirelessly. Such communication can occur via Input/Output (I/O) interfaces/ports 160. The I/O interface/ports 160, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment.

Figure 8:
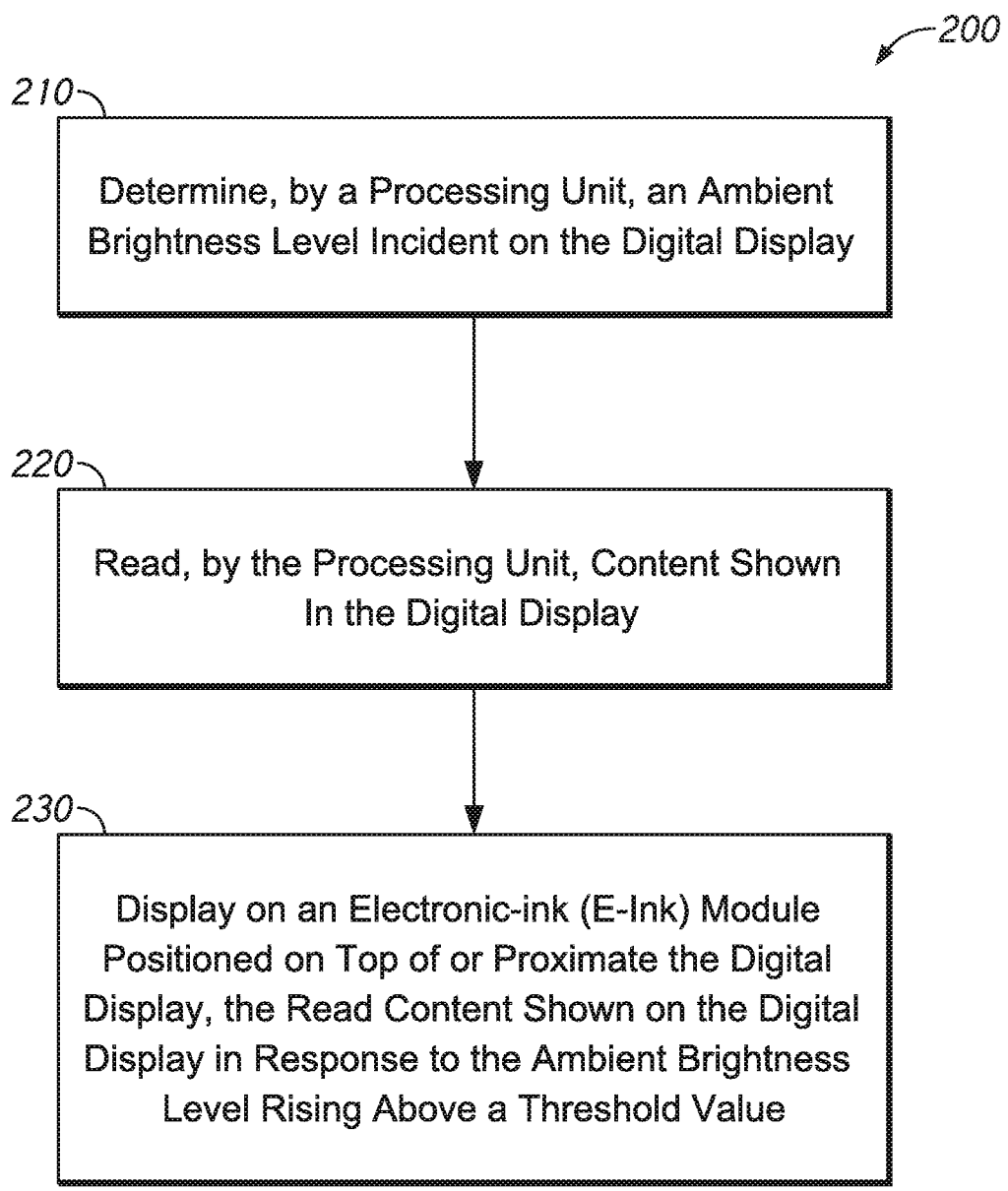
FIG. 8 is a flowchart of a method of enhancing the brightness of a digital display in accordance with embodiments of the subject technology.

Referring now to FIG. 8, a method 200 of enhancing the brightness of a digital display is shown according to an exemplary embodiment. The method 200 includes determining 210, by a processing unit, an ambient brightness level incident on the digital display. The processing unit may read 220 content shown in the digital display. In addition, the read content shown on the digital display may be displayed 230 on an electronic-ink (E-ink) module positioned on top of or proximate the digital display, in response to the ambient brightness level rising above a threshold value.

As will be appreciated by one skilled in the art, aspects of the disclosure may be embodied as a system, method or process, or computer program product. Accordingly, aspects of the subject technology may take the form of an entirely hardware embodiment, an entirely software embodiment (including firmware, resident software, micro-code, etc.) or an embodiment combining software and hardware aspects that may all generally be referred to herein as a "module", "circuit", or "system." For example, a "memory module"

may in some hardware embodiments be any one of the system memory 120, data storage (for example, hard drive, SSD, firmware), or any combination thereof. Furthermore, aspects of the subject technology may take the form of a computer program product embodied in one or more computer readable media having computer readable program code embodied thereon.

Aspects of the subject technology are described above with reference to block diagrams of methods, apparatus (systems) and computer program products according to embodiments. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the scope of any embodiment.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for enhancing the brightness of a digital display on a printing apparatus, comprising:
   an electronic-ink (E-ink) module including an E-ink display positioned over the digital display;
   a brightness detection module;
   a display reader module positioned between the digital display and the E-ink display, wherein the display reader module is configured to read content shown in the digital display; and
   a brightness enhancer controller connected to the E-ink module, to the brightness detection module, and to the display reader module, wherein the brightness enhancer controller is configured to:
      determine an ambient brightness level from a signal generated by the brightness detection module,
      read, from the display reader module, the content shown in the digital display, and
      display on the E-ink display, the read content shown on the digital display in response to the ambient brightness level rising above a threshold value, wherein the E-ink display is transparent and the digital display shows through the E-ink display until the read content shown on the digital display is displayed within the E-ink module.

2. The system of claim 1, wherein the E-ink module comprises a thin film housing.

3. The system of claim 2, wherein the thin film housing is configured to flex in response to tactile input of a user.

4. The system of claim 1, wherein the brightness detection module includes a photodiode disposed to detect an ambient light level on the digital display.

5. The system of claim 1, wherein the brightness detection module comprises a clock and wherein the brightness enhancer controller is configured to display the read content from the digital display on the E-ink module during a programmed range of time signaled by the clock.

6. A printing apparatus, comprising:
   a digital display for displaying information, wherein the digital display is a tactile display;
   an electronic-ink (E-ink) module including an E-ink display, wherein the E-ink display is positioned overlying the digital display;
   a brightness enhancer controller connected to the E-ink module, wherein the brightness enhancer controller is configured to:

read content shown in the digital display, and
display on the E-ink display, the read content shown on the digital display, wherein the read content shown on the digital display is mapped and shown in a one-to-one position in the overlying E-ink display, replicating a position of the read content shown in the digital display on the E-ink display for receipt of a user's tactile input.

7. The apparatus of claim 6, further comprising a brightness detection module connected to the brightness enhancer controller, wherein the brightness enhancer controller is further configured to:
   determine an ambient brightness level from a signal generated by the brightness detection module; and
   operate display of the read content on the E-ink display based on the ambient brightness level.

8. The apparatus of claim 7, wherein the E-ink module comprises a thin film configured to flex in response to tactile input of a user.

9. The apparatus of claim 8, wherein the tactile input of a user on the thin film is registered by the digital display.

10. The apparatus of claim 8, wherein the tactile input of a user on a button or selection option displayed on the E-ink display is registered by a processing unit connected to the E-ink module as a selection of a corresponding element in the mapped, one-to-one position shown in the digital display.

11. A method of enhancing the brightness of a digital display, comprising:
   determining, by a processing unit, a time from a clock connected to the processing unit;
   reading, by the processing unit, content shown in the digital display;
   operating an E-ink display of an electronic-ink (E-ink) module positioned on top of the digital display, wherein the E-ink display is in a transparent state based on the time and the digital display is visible under the E-ink display in the transparent state; and
   determining whether the time from the clock is a programmed time of day for triggering a change of operational state in the E-ink display wherein,
      the E-ink display is operated to block the view of the digital display, and
      the read content shown on the digital display is displayed on the E-ink display in response to the determined time of day being the programmed time of day.

12. The method of claim 11, further comprising showing the read content in the digital display in a one-to-one position mapped position in the E-ink display.

13. The method of claim 11, wherein the E-ink module comprises a thin film housing and the method further comprises registering a touch of a user on the E-ink display corresponding to a selection of an element shown in the content in the digital display.

14. The method of claim 11, wherein the E-ink module is an after-market device connectable to an apparatus including the digital display.

15. The method of claim 11, wherein the digital display is part of a printing apparatus.

* * * * *